United States Patent [19]

Shepperd, III et al.

[11] Patent Number: 5,611,934
[45] Date of Patent: Mar. 18, 1997

[54] PROCESS FOR DYE REMOVAL

[75] Inventors: Paul W. Shepperd, III, Mooresville; Larry W. Becker, Charlotte; Robert J. Cundiff, Mt. Holly, all of N.C.

[73] Assignee: Hoechst Celanese Corporation, Somerville, N.J.

[21] Appl. No.: 574,009

[22] Filed: Dec. 18, 1995

[51] Int. Cl.⁶ .................. C02F 1/56; C02F 1/70
[52] U.S. Cl. .............. 210/719; 210/724; 210/727; 210/728; 210/734; 210/735; 210/736; 210/917
[58] Field of Search .................. 210/724, 727, 210/728, 734, 735, 736, 917, 719

[56] References Cited

U.S. PATENT DOCUMENTS

| | | | |
|---|---|---|---|
| 4,783,265 | 11/1988 | Timmons | 210/666 |
| 4,975,203 | 12/1990 | Cook et al. | 210/716 |
| 5,360,551 | 11/1994 | Weber | 210/719 |

FOREIGN PATENT DOCUMENTS

| | | |
|---|---|---|
| 52-116644 | 9/1977 | Japan . |
| 54-29897 | 3/1979 | Japan . |
| 63-69589 | 3/1988 | Japan . |
| 9107354 | 5/1991 | WIPO . |
| 9308892 | 5/1993 | WIPO . |
| 9505345 | 2/1995 | WIPO . |

OTHER PUBLICATIONS

M. Kolb et al, *Melliand Testilber* 1988, 69(4), E155.286–7: "The Decolorization of Textile Waste Water by Dithionite".

A. Reife Book Pap.—Int. Conf. Exhib. AATCC 1990, 201–4: "Waste Treatment of Soluble Axo Acid, Direct and Reactive Dyes Using a Sodium Hydrosulfite Reduction Pretreatment Followed by Carbon Adsorption".

D. L. Michelson et al, "Chemical Pretreatment of Concentrated Reactive Dye Discharges Prior to Biodegradation", presented at Amer. Chem. Soc. Emerg. Techn. for Hazardous Waste Management, Oct. 3, 1991, printed in *Emerging Technologies in Hazardous Waste Management III*, (Amer. Chem. Soc. 1993).

R. Tanaka et al, Seni Kako 1976, 28(1):14–19, *Chem. Abstr.* 1976, 85: 112355f (Japanese—English Abstract).

D. Kupfer, German Offenlegenschrift 2323600, Nov. 21, 1974, *Chem Abstr.* 1975, 82: 89847v.

M. Sarvwatari, Senshoku Kenkvu 1980, 24(4): 142, *Chem. Abstr.* 1981, 95: 224973u (Japanese—English Abstract).

*Kirk Othmer*, (3rd edition, vol. 2 (1978), at p. 244ff.

*Standard Method of Water and Wastewater Analysis* (18th edition) (edited by A.E. Greenberg, L.S. Clesceri and A.D. Eaton) (American Public Health Association, 1992), Color Method 2120 A, pp. 2–1–2–2, Color Method 2120 E, pp. 2–7–2–8 and Procedure 2540 F. from Section 3: "Settleable Solids", pp. 2–57.

M. M. Cook et al, "Preprint Extended Abstract", presented before the Division of Environ. Chem. Amer. Chem. Soc., Apr. 5–10, 1992.

K. Vinodgopal et al, Langmuir 1994, 10, "A Photocatalytic Approach for the Reductive Decolorization of Textile Azo Dyes in Colloidal Semiconductor Suspensions", Amer. Chem. Soc. 1994, pp. 1767–1771.

Trade Literature—MetaFloc 137 cationic polyquaternary amine in water May, 1993.

*Kirk Othmer*, (3rd edition, vol. 24 (1984) at p. 295ff.

*Primary Examiner*—Neil McCarthy
*Attorney, Agent, or Firm*—R. H. Hammer, III

[57] ABSTRACT

A process for dye removal from effluent is disclosed which includes treating the effluent with a reducing agent, adjusting the pH to a selected value in the range of 2–7, treating the effluent with a particular charge neutralization mixture, adjusting the pH a second time and subjecting the mixture to a flocculating process with selected chemicals.

18 Claims, No Drawings

PROCESS FOR DYE REMOVAL

FIELD OF THE INVENTION

This invention relates to the chemical treatment of waste streams from plants that make or use dyes to render the wastewater suitable for reuse. This invention describes a method of treating dye waste water generated, for example, by textile operations or dye manufacturing operations so that the color bodies are destroyed and the effluent may be reused in the plant or discharged into the sewer. This invention is directed toward removing the color before the waste water is discharged to a lagoon or sewer. This invention is especially important in light of new environmental policies which are becoming more restrictive.

BACKGROUND OF THE INVENTION

The dye waste stream from plants that make or use dyes generally contains many different colored residues which do not undergo rapid biodegradation. The use of reducing agents such as sodium hydrosulfite (also called sodium dithionite), formamidine sulfinic acid (FAS), and sodium borohydride to decolorize dye manufacturing and textile dyeing effluents have been described in the literature. Simple reduction by these agents results in a yellow colloidal solution. Some examples of references discussing this technology include: M. Kolb et al, *Melliand Testilber* 1988, 69(4), E155.286–7: *Chem. Abstr.* 1988, 108: 2262993h; A. Reife Book Pap.—Int. Conf. Exhib. AATCC 1990, 201–4: *Chem. Abstr.* 1991, 114: 149417w; and D. L. Michelson et al, "Chemical Pretreatment of Concentrated Reactive Dye Discharges Prior to Biodegradation", presented at Amer. Chem. Soc. Emerg. Techn. for Hazardous Waste Management, Oct. 3, 1991 (and references therein).

Other references which discuss this problem and/or possible solutions include: H. Takahashi and T. Fujii, *Japanese Kikai Tokkyo Koho*, 79: 29,897, Mar. 6, 1979, *Chem. Abstr.* 1979, 91.44165r; Y. Tanto et al, *Japanese. Kikai Tokkyo Koho*, 77: 116,644, Sep. 30, 1977, *Chem. Abstr.* 1978, 89: 30358c; R. Tanaka et al, *Seni Kako* 1976, 28(1): 14–19, *Chem. Abstr.* 1976, 85: 112355f; D. Kupfer, German Offenlegenschrift 2323600, Nov. 21, 1974, *Chem. Abstr.* 1975, 82: 89847v; M. Sarvwatari, *Senshoku Kenkvu* 1980, 24(4): 142, *Chem. Abstr.* 1981, 95: 224973u; and Ml Kaimori et al, *Japanese Kikai Tokkyo Koho*, 63: 69,589 (88 69,589) Mar. 29, 1988, *Chem. Abstr.* 1988, 108: 226364g. However, simple treatment with hydrosulfite does not produce a water suitable for reuse in dyeing.

An improved method of treatment employing sodium bisulfite catalyzed sodium borohydride with a cationic agent has been reported by Cook, et al in U.S. Pat. No. 4,975,203. Another improved method of treatment employing flocculation with a cationic polymer followed by treatment with a reducing agent such as sodium hydrosulfite has been patented in U.S. Pat. No. 5,360,551 by Weber.

Other additives have also been tried to remove impurities from such systems. The use of aluminum salts to treat waste water has a long history. Alum has been one of the most effective coagulants used. (See *Kirk Othmer*, (3rd edition Vol.2 (1978), at pages 244ff and Vol. 24 (1984) at pages 295ff). More recently, other aluminum salts that are more basic such as polyaluminum chloride and polyaluminum chloride sulfate have been used and have been found more effective in waste treatment than alum. Aluminum hydroxychloride, an 83% basic material containing 23% aluminum as alumina has only recently found application in the waste treatment industry.

There have been problems with all of these efforts, however. One problem is that large volumes of solids are produced. Another is that the floc produced settles slowly, if at all, and finally, the effluent from some types of treatments still retains a yellow color resulting in staining of the cloth when the water is reused in dyeing. The need to recycle makes the yellow color undesirable or unacceptable while the large volumes of solids produced create their own disposal problems and slow settling solids create the need to have very large and expensive settling basins.

In addition, these previous attempts at treating such effluents still leaves dissolved salts in the water. High concentration of dissolved salts in effluent present problems in treating the textile plant effluent and the receiving waters. Usually these salts are discarded with the dye waste to a lagoon or sewer system. The ability to reuse such water in the manufacturing process would be a valuable benefit from a cost and environmental viewpoint.

Thus, there still remains a need for improved processes for decolorizing effluent containing dyes. Therefore, it is an object of this invention to provide a method for decolorizing textile waste water or other types of effluent containing color materials which results in a less colored effluent and at the same time produces a compact and rapid settling floc. It is another object of this invention to provide a method for decolorizing such water in a way which allows effluent to be recycled into the manufacturing process. These and further objects of the invention will be apparent from the following description.

SUMMARY OF THE INVENTION

This invention is a multi-step process that decolorizes waste effluent from sources that make or use dyes, including textile dye operations and dye manufacturing. In this process effluent containing dyes is treated by exposure to sodium hydrosulfite in combination with an aluminum hydroxychloride/cationic polymer mixture followed by the addition of a flocculent. Note that the term flocculent is used in this application to describe a high molecular weight polymer (for example, over 2 million in molecular weight) which coalesces smaller particles via a bridging mechanism. Throughout the process selected pH conditions are used to improve clarification beyond conventional treatment. The ADMI unit used here is that described in ADMI Tristimulus Filter Method 2120E, pages 2–7 (1988) as modified by using only 3 wave lengths (590, 540 and 438 nanometers) as opposed to the general procedure where color is measured over the entire visible spectrum. This modification to the ADMI method 2120E is also known as the Martinsville Modification and is incorporated by reference herein. Note that the term coagulant as used herein describes a low molecular weight cationic polymer (for example, 2,000–500,000 molecular weight) which coalesces smaller particles via a surface-charge neutralization mechanism.

The process of the present invention may be conveniently summarized as follows: a process for treating liquid effluent containing dye comprising:

(a) treating the effluent with a reducing agent at a concentration of 50–100 parts per million of a reducing agent per 1000 ADMI units of color;

(b) reducing the pH of the liquid effluent to a value in the range of 2.0–7.0 ;

(c) treating the liquid effluent with a coagulant to neutralize the surface charge on suspended materials, wherein said neutralization mixture comprises in a ratio of 30–70 to 70–30 percent by weight (i:ii):
  (i) at least one aluminum salt selected from the group consisting of aluminum hydroxychloride, aluminum polyhydroxychloride, alum, aluminum chloride, and sodium aluminate; and
  (ii) a cationic polymer selected from the group consisting of:
    (A) at least one water soluble cationic polymer selected from the group consisting of (A) a copolymer of acrylamide with a cationic monomer such as methacryloylethyltrimethylammonium [$X^-$] or acryloylethyltriomethylammonium[$X^-$], wherein $X^-$ is selected from the group consisting of chloride, bromide, iodide, $SO_4^{-2}$ and $CH_3SO_4^{-2}$; (B) polyamines of Formula I as described below; and (C) polyquaternary ammonium compounds of Formula II described below,
  until the Zeta potential reaches ±15 millivolts;
(d) adjusting the pH of a mixture thus formed to be greater than or equal to 5; and
(e) subjecting the mixture to a flocculating process by adding from 1–5 parts per million of at least one compound selected from the group consisting of:
  (i) anionic polymers selected from the group consisting of acrylic acid/acrylamide copolymers in excess of 2 million molecular weight; and
  (ii) nonionic polymers selected from the group consisting of polyacrylamides greater than 2 million molecular weight;
which binds the flocs formed in step c into large, dense, easily-settled particles.

DETAILED DESCRIPTION OF THE INVENTION AND DESCRIPTION OF THE PREFERRED EMBODIMENTS

This invention is a process for treating effluent that contains dyes. In one embodiment which is a multi-step process, the first step splits the dye molecules to render them colorless and reduces the metal ions which makes them more susceptible to precipitation. The pH is then adjusted and the resulting mixture is treated with a coagulant which binds to the dye fragments, suspended solids and remaining color bodies allowing them to form fine, soft flocs (pin-flocs). Finally, the stream is treated with a flocculent which binds the flocs into tight, easily-settled masses. The solids are then removed by settling or filtration. The effluent stream can then be recycled back into the particular manufacturing or dyeing operation. The advantages for this invention over other efforts in this area are more efficient color removal, improved water clarity, reduced effluent toxicity and the ability to recover and reuse salts such as sodium sulfate. These advantages result in substantial savings in manufacturing and disposal costs.

For the purposes of this application the term flocculent as defined above is a high molecular weight polymer which bridges from particle to particle, and coagulant is a mixture of low molecular weight cationic polymer(s) bearing high charge and an aluminum salt which adsorbs onto solid particles to neutralize particle surface charge to near zero, thereby permitting particles to stick together.

In general this process may be used to decolor waste streams containing dyes of any class such as reactive, direct, acid, basic, as long as the chromophore contains sulfide, azo or other chemical bonds which can be reductively reduced or broken. It is preferred that dyes capable of forming substituted benzidines or anilines be treated with an additional oxidative or other method known to those skilled in the art to eliminate the presence of toxic by-products.

The dye waste stream is first treated with a water soluble reducing agent selected from the group consisting of (a) sodium hydrosulfite, (b) sodium borohydride + sodium bisulfite, (c) sodium borohydride (Borol® solution) +$SO_2$, and (d) peroxide catalyzed trithiotriazine. The preferred pH for hydrosulfite addition is pH 3.5 or greater, while a pH of 6 or greater is more preferred and a pH above 7 is most preferred. This results in loss of color associated with the initial waste and, in general, a straw color solution which is not suitable for reuse or discharge is produced in this stage of the process.

The second step in the process is the lowering of the pH below 7, and preferably to about 2.0–4.0 with a mineral acid such as sulfuric, nitric or hydrochloric acid or, alternatively, an organic acid such as acetic acid. Preferably the pH should be lowered to a value below about 7, such as a pH not exceeding 5, and most preferably to a value below 3.5. This reduces the solubility of the reduced dye by-products causing additional precipitation of solids.

In the third step one adds a mixture of (a) at least one aluminum salt selected from the group consisting of aluminum hydroxychloride, aluminum polyhydroxychloride, alum, aluminum chloride and sodium aluminate (particularly aluminum hydroxychoride); and (b) at least one water soluble cationic polymer selected from the group consisting of: (A) a copolymer of acrylamide with a cationic monomer such as methacryloylethyltrimethyl ammonium [$X^-$] or acryloylethyltrimethylammonium [$X^-$], wherein $X^-$ is selected from the group consisting of chloride, bromide, iodide, $SO_4^{-2}$ and $CH_3SO_4^{-2}$, (B) polyamines of Formula I (below); and (C) polyquaternary ammonium compounds of Formula II (below). Suitable polyamines may be selected from those of the group consisting of compounds of Formula I:

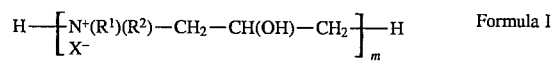  Formula I wherein: $R^1$ and $R^2$ may be the same or different and are each independently selected from the group consisting of hydrogen and $C_1$–$C_8$ straight or branched alkyl; and substituted $C_1$–$C_8$ straight or branched alkyl; and n is a number from 200 to 50,000; and $X^-$ is selected from the group consisting of chloride, bromide, iodide, $SO_4^{-2}$ and $CH_3SO_4^{-2}$. The preferred molecular weight for the water soluble cationic polymers should range from about 10,000 to 250,000, as determined by gel permeation chromatography. Polymers having molecular weights ranging from about 25,000 to 100,000 are more preferred.

The most preferred polyamines are dimethylamine/epichlorohydrin polymers having a molecular weight of 25,000 to 100,000.

The polyquaternary ammonium compounds may be selected from those represented by Formula II:

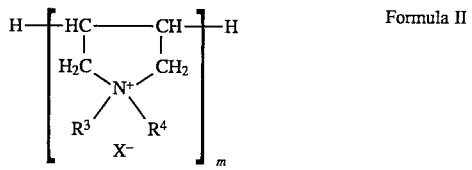  Formula II wherein $R^3$ and $R^4$ may be the same or different and are each independently selected from the group consisting of $C_1$–$C_8$ straight or branched alkyl, m is a number from 200 to 50,000 and $X^-$ has the same meaning as described for Formula I. Preferred values for $R^3$ and $R^4$ are methyl. The compound of Formula II is then added to the waste stream to coagulate the precipitated and insoluble material into larger particles.

When quaternary ammonium compounds are used as the water soluble cationic polymer the preferred compounds are any water soluble diallyldi-(C1 to C8) alkyl ammonium polymers. More preferred are polymers of about 25,000 to 250,000 molecular weight (measured via gel permeation chromatography), and most preferred are polymers of 50,000 to 200,000 molecular weight.

The preferred polyquaternary ammoniums are polydiallyldimethylammonium chloride (polyDADMAC), polydiallyldiethylammonium chloride (polyDADEAC), polydiallyldimethylammonium bromide (polyDADMAB), polydiallyldiethylammonium bromide (polyDADEAB). The most preferred is diallyldimethylammonium chloride homopolymer.

Another particular group of cationic polymers are those comprised of (A) at least one water soluble cationic polymer selected from the group consisting of (A) a copolymer of acrylamide with a cationic monomer such as methacryloylethyltrimethylammonium[$X^-$] or acryloylethyltrimethylammonium[$X^-$] wherein $X^-$ selected from the group consisting of chloride, bromide, iodide, $SO_4^{-2}$ and $CH_3SO_4^{-2}$.

The mixture of the aluminum salt and water soluble cationic polymer described above may also be referred to as Mixture A. The ratios of aluminum salt to water soluble cationic polymer in Mixture A can range from 2.1 to 1.2 and should be at least from 1:1.5 to 1.5:1 by weight, on a 50 percent active basis. Preferably, the ratio should range from 1.25:1 to 1:1.25 with the most preferred ratio being 1:1. Mixture A may be added with the hydrosulfite or immediately following hydrosulfite addition. The preferred pH for the solution to which Mixture A is added is pH 7 or below. A more preferred pH is 5 or below and the most preferred pH is 3.5 or below. In a preferred embodiment the pH of the solution is lowered to 3.5 or below, a mixing period of 5–30 minutes is allowed and then Mixture A is added.

The fourth step, is the upward adjustment of pH to a value of at least 7 by the addition of sodium hydroxide or a carbonate such as sodium carbonate.

The fifth step (e), is the treatment of the mixture of precipitate and dye waste solution resulting from the previous steps with a flocculant to bridge the flocs together to generate large, easily-settled particles. Removal of coagulated waste particles may be accomplished by adding 0.1–10 parts per million (ppm) of polymeric flocculent based on the volume of treated waste. The flocculent is selected on the basis of two criteria: the amount of charge and molecular weight. The flocculent is selected from a group consisting of anionic and cationic copolymers such as water soluble polyacrylamides.

When anionic flocculents are used in step (e), the charge of the polymer may vary from 1–70 percent. The preferred charge is from 5–60 percent. More preferred are polymer flocculents with 10–35 percent charge while the most preferred anionic charge varies from 20–30 percent. The preferred molecular weight of the polymer flocculents is about 5–25 million molecular weight (as measured by gel permeation chromatographic techniques well known to those skilled in the art). The most preferred are polymer flocculents of about 10–15 million molecular weight.

With respect to the cationic polymers, those useful in this invention are those generally synthesized from cationic ester monomers such as methacryloyltrimethylammonium chloride (METAC) or acryloyltrimethylammonium chloride (ATAC) and acrylamide.

Other monomers with quaternary groups may be used such as methyacrylamidopropyltrimethylammonium chloride (MAPTAC). For cationic polymer coagulants the preferred charge is between 1–60 percent by weight. More preferred is a cationic charge between 10–50 percent by weight, and most preferred as a cationic coagulant is one between 20–40 percent charge. A molecular weight of 4–10 million is preferred; more preferred is 4–8 million and most preferred is 5–7 million molecular weight.

The preferred polymeric form of the flocculants used in step (e) include those which are commercially available as solutions, solids, microbeads or inverse emulsions. The most preferred are the inverse emulsions because of the ease of handling and use. Such emulsions may be prepared by methods known to those skilled in the art.

The typical dose of polymeric flocculant used in step (e) is 1–50 parts per million by weight while 2–20 ppm is more preferred and 2–15 is most preferred.

Color measurements were taken by one of two methods—Color Method 2120 A or Color Method 2120 E as found in *Standard Methods of Water and Wastewater Analysis* (18th edition)(edited by A. E. Greenberg, L. S. Clesceri and A. D. Eaton) (American Public Health Association, 1992). Floc settling volumes and times were determined using Procedure 2540 F from Section 3: "Settleable Solids", page 2–57 of the same reference.

In an alternate embodiment, silica may be added to enhance the coagulation and flocculation processes. Up to 100 part per million (ppm) silica is added along with or after the reducing agent but prior to addition of the coagulant. Most preferably one would use 50–100 ppm silica.

In another embodiment of the invention, an aeration step may be used to facilitate the coagulation described in step (b). Such a technique is practiced by allowing 5–10 minutes for step 1 to come to completion. Air is then sparged into the solution for 10–20 minutes, preferably 15–20 minutes, to facilitate precipitation of dissolved solids.

In yet another and preferred embodiment, a one bag system may be used wherein sodium hydrosulfite crystals, aluminum hydroxychloride (or other coagulant as described above) encapsulated with a water soluble coating requiring 1–10 minutes to solubilize (for example, a cooked cationic starch), and alkali are blended as a powder. The mixture may than be added to a dissolving system such as the VOSS system sold by Hoechst Celanese Corporation (Somerville, N.J.) and the liquid from the VOSS system is contacted with the colored waste water. In this embodiment a dry mixture of 1 part hydrosulfite to 1–6 parts encapsulated aluminum hydroxychloride or coagulant blend (for example, the Mixture A above) and sufficient alkali (preferably sodium carbonate) is added to sufficient water to give a solution of 1–18 percent hydrosulfite. This solution is then added to the dye-containing waste. This may be done by diluting with water then adding to the dye-waste stream or, alternatively, by simply adding the powdered product to the dye stream with sufficient mixing to dissolve. A level of 50–100 parts per million of hydrosulfite should be present during treatment. All ratios and parts described here are on a weight basis. The encapsulated aluminum hydroxychloride or Mixture A may be produced by any conventional encapsulation technology including, but not limited to, spray drying.

In yet another preferred embodiment at least one member of the group consisting of magnesium chloride, magnesium carbonate and magnesium sulfate is substituted at a level no exceeding 1000 parts per million per 1000 ADMI color units for the flocculent mixture in step (c) of the present invention.

EXAMPLES

The following examples demonstrate the invention in greater detail. The examples are not intended to limit the scope of the invention in any way. Unless otherwise indicated, all scientific and chemical symbols and abbreviations have their usual and customary meanings such as ml for milliliter, and g or gm for gram.

In the examples, the following products are used:
(1) Aluminum polyhydroxychloride (LOCRON® was obtained from Hoechst Celanese Corporation, Somerville, N.J.) as a 50% solution by weight;
(2) Agefloc™ A-50 HV high molecular weight cationic polymer (from CPS Chemical Company, Old Bridge, N.J.).
(3) A polymeric flocculent (BOZERET™ 30 from Hoechst Celanese Corporation. This inverse emulsion has 30% anionic charge and is a sodium acrylate/acrylamide copolymer.)

Measurement of floc volumes and settling times was carried out using Imhoff Cones according to standard method 2540F *STANDARD METHODS* as described above.

GENERAL COAGULATION/FLOCCULATION PROCEDURE

A dye waste (18.9 liters, 5 gallons) obtained from a commercial plant doing exhaust and print dyeing containing an unknown mixture of red, blue and black dyes was heated to approximately 50 degrees centigrade. Sodium hydrosulfite product (SPC 5519, Hoechst Celanese Corporation) was added with stirring; generally 0.1 to 0.5 g of the SPC 5519 product was added for each liter of waste. Heating and stirring was continued for 0.5 hour. The pH of the reduced dye waste solution was adjusted to 3–3.5 by adding sulfuric acid until the desired pH was obtained. The solution became cloudy over time and the initial yellow color diminished. The resultant solution was divided into separate 1 liter breakers for coagulant studies. The beakers were put into a gang jar stirrer.

Various coagulants (as 1% solutions) listed in Table I below were added with rapid stirring for 2 minutes. The solutions were stirred slowly for 8 minutes. The pH was adjusted to 7 to 7.5. Polymeric flocculent (0.5% solution) was added with 1 minute of rapid stirring followed by 2 minutes of slow stirring. The mixtures were then poured into Imhoff cones for comparison of settling times.

EXAMPLE 1

Dye effluent (1 liter) at 120 degrees F. was placed in beakers with a gang mixer. Stirring was set to maximum for 5 minutes then reduced to 10 percent for 10 minutes. A 20 ml sample was removed for color analysis by the ADMI three point method adapted by the city of Martinsville (Va.) waste treatment plant. (See ADMI Tristimulus Filter Method 2120E, pages 2–7, Martinsville Modification, as described above.) The remaining 980 ml were transferred to an Imhoff Cone where the floc volume was measured according to procedure 2540F for settleable solids as found in *Standard Methods for the Examination of Water and Wastewater*, 18th edition, 1992.

EXAMPLE 2

Heated dye waste (1 liter at about 120 degrees F, 48.9 degrees C) was treated as in Example 1, except that 300 ppm of sodium hydrosulfite product SPC 5519 (from Hoechst Celanese Corporation) was added during the high speed mixing step.

EXAMPLE 3

A sample was treated as in Example 2 except that 300 ppm of alum was substituted for the hydrosulfite addition.

EXAMPLE 4

A sample was treated as in Example 3 except that a high molecular weight cationic polymer (Agefloc™ A-50 HV) was added as the coagulant.

EXAMPLE 5

A sample was treated as in Example 3 except that a 50/50 blend of aluminum hydroxychloride and Agefloc™ A-50 HV was added as the coagulant.

EXAMPLE 6

A sample was treated as in Example 3 except that aluminum hydroxychloride was substituted for the alum.

EXAMPLE 7

The method described in Example 1 was repeated except that the addition of hydrosulfite was followed by the addition of 350 ppm of alum.

EXAMPLE 8

The method described in Example 7 was repeated except that 5 ppm of a high molecular weight polyacrylamide Bozeret™ 30 polymer from Hoechst Celanese Corporation was added after the alum.

EXAMPLE 9

(The Preferred Method of the Invention)

The method described in Example 8 was repeated except that instead of alum, a blend of 50/50 aluminum hydroxychloride/Agefloc™ A-50 HV was added. This step was followed by the addition of 5 ppm of a high molecular weight anionic polyacrylamide (Bozeret™ 30 from Hoechst Celanese Corporation).

EXAMPLE 10

The method described in Example 9 was repeated without Bozeret™ 30 product.

The results of the previous Examples are recorded in Table I. Note that the method of the invention (Example 9) produces superior (lower) color and a more dense (lower volume) floc.

Note also that the method of the invention without the final flocculent (Example 10) produces a superior floc but not low color.

TABLE I

| EXAMPLE NUMBER | TREATMENT | FINAL FLOC (ml) | ADMI COLOR |
| --- | --- | --- | --- |
| 1 | Control | — | 2870 |
| 2 | Hydro only | 0 | 1700 |
| 3 | Alum only | 210 | 836 |
| 4 | Cationic organic coagulant | sticky | 1310 |

TABLE I-continued

| EXAMPLE NUMBER | TREATMENT | FINAL FLOC (ml) | ADMI COLOR |
|---|---|---|---|
| 5 | Cationic coagulant with blend | 140 | 522 |
| 6 | AHC used instead of blend in invention | 180 | 612 |
| 7 | Hydro + alum | 190 | 793 |
| 8 | Hydro + alum + high mol. wt. polymer | 100 | 836 |
| 9 | Method of invention | 65 | 348 |
| 10 | Method of invention without final flocculent | 50 | 642 |

What is claimed is:

1. A process for treating liquid effluent containing dye comprising steps (a)–(e):
    (a) treating the effluent with a reducing agent at a concentration of 50–100 parts per million of reducing agent per 1000 ADMI units of color;
    (b) reducing the pH of the liquid effluent to a value in the range of 2.0–7.0;
    (c) treating the liquid effluent with a charge neutralization mixture wherein said neutralization mixture comprises in a ratio of 30–70 to 70–30 parts by weight of i:ii:
        (i) at least one aluminum salt selected from the group consisting of aluminum hydroxychloride, aluminum polyhydroxychloride, alum, aluminum chloride and sodium aluminate; and
        (ii) a cationic polymer selected from the group consisting of:
            (A) at least one water soluble cationic polymer selected from the group consisting of (A) a copolymer of acrylamide with a cationic monomer selected from the group consisting of: methacryloylethyltrimethylammonium[X⁻] and acryloylethyltrimethylammonium[X⁻], wherein X⁻ is selected from the group consisting of chloride, bromide, iodide, $SO_4^{-2}$ and $CH_3SO_4^{-2}$;
            (B) a compound of Formula I:

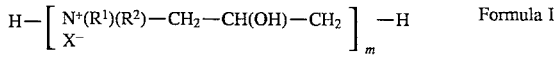

Formula I wherein: $R^1$ and $R^2$ may be the same or different and are each independently selected from the group consisting of hydrogen and $C_1$–$C_8$ straight or branched alkyl; and substituted $C_1$–$C_8$ straight or branched alkyl; $X^-$ is selected from the group consisting of chloride, bromide, iodide, $SO_4^{-2}$ and $CH_3SO_4^{-2}$; m is a number from 200 to 50,000; and
            (C) a compound of Formula II:

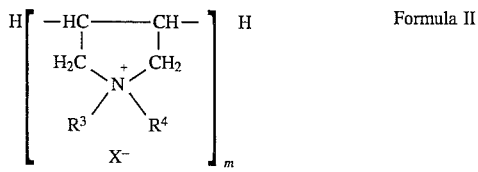

Formula II wherein $R^3$ and $R^4$ may be the same or different and are each independently selected from the group consisting of $C_1$–$C_8$ straight or branched alkyl, m is a number from 200 to 50,000 and $X^-$ has the same value as defined in Formula I, until the Zeta potential reaches±15 millivolts;
    (d) adjusting the pH of a mixture thus formed to be greater than or equal to 5.0; and
    (e) subjecting the mixture to a flocculating process by adding 1–5 parts per million of at least one compound selected from the group consisting of:
        (i) anionic polymers selected from the group consisting of acrylic acid/acrylamide copolymers in excess of 2 million molecular weight; and
        (ii) nonionic polymers selected from the group consisting of polyacrylamides greater than 2 million molecular weight.

2. A process as claimed in claim 1 wherein the aluminum salt in (c) (i) is aluminum hydroxychloride.

3. A process as claimed in claim 1 wherein said reducing agent is selected from the group consisting of:
    (a) sodium hydrosulfite;
    (b) sodium bisulfite + sodium borohydride;
    (c) sodium borohydride solution + $SO_2$; and
    (d) peroxide catalyzed trithiotriazine.

4. A process as claimed in claim 3 wherein said reducing agent is sodium hydrosulfite.

5. A process as claimed in claim 1 wherein in step (b), the pH is lowered to a value of about 2.0–4.0.

6. A process as claimed in claim 1 wherein in step (b), the pH is lowered to a value below 3.5.

7. A process as claimed in claim 1 wherein in step (c) a mixture of (a) at least one aluminum salt selected from the group consisting of aluminum hydroxychloride, aluminum polyhydroxychloride, alum, aluminum chloride and sodium aluminate; and (b) at least one water soluble cationic polymer selected from the group consisting of compounds of Formula I having a molecular weight of from about 10,000 to 250,000 are used.

8. A process as claimed in claim 1 wherein in step (c) a mixture of (a) at least one aluminum salt selected from the group consisting of aluminum hydroxychloride, aluminum polyhydroxychloride, alum, aluminum chloride and sodium aluminate; and (b) at least one water soluble cationic polymer selected from the group consisting of compounds of Formula I having a molecular weight of from about 25,000 to 100,000 are used.

9. A process as claimed in claim 2 wherein in step (c) a mixture of (a) at least one aluminum salt selected from the group consisting of aluminum hydroxychloride, aluminum polyhydroxychloride, alum, aluminum chloride and sodium aluminate; and (b) at least one water soluble cationic polymer selected from the group consisting of compounds of Formula I which are dimethylamine/epichlorohydrin polymers having a molecular weight of from about 25,000 to 100,000 are used.

10. A process as claimed in claim 2 wherein in step (c) a mixture of (a) at least one aluminum salt selected from the group consisting of aluminum hydroxychloride, aluminum polyhydroxychloride, alum, aluminum chloride and sodium aluminate; and (b) at least one water soluble cationic polymer selected from the group consisting of compounds of Formula II are used.

11. A process in claimed in claim 10 wherein the compound or compounds of Formula II is selected from water soluble diallyldi-($C_1$–$C_8$) alkyl ammonium[X⁻] polymers.

12. A process as claimed in claim 10 wherein the compound or compounds of Formula II has a molecular weight of from about 25,000 to 250,000.

13. A process as claimed in claim 10 wherein the polyquaternary ammoniums are selected from the group consisting polydiallyldimethylammonium chloride (polyDADMAC), polydiallyldiethylammonium chloride (polyDADEAC), polydiallyldimethylammonium bromide (polyDADMAB), and polydiallyldiethylammonium bromide (polyDADEAB).

14. A process as claimed in claim 1 wherein for step (e) the flocculent is selected to be nonionic, cationic or anionic water soluble polyacrylamides.

15. A process as claimed in claim 14 wherein the flocculent is added in an amount of from 2–15 parts per million.

16. A process as claimed in claim 1 wherein silica is added in an amount sufficient to enhance flocculation and settling.

17. A process as claimed in claim 1 comprising an additional aeration step before step (c) to facilitate coagulation in step (c).

18. A process as claimed in claim 1 wherein the aluminum hydroxychloride is encapsulated.

* * * * *